United States Patent [19]

Foster

[11] Patent Number: 5,419,426
[45] Date of Patent: May 30, 1995

[54] SNAP-IN CONVEYOR SLAT WEAR PLATE

[76] Inventor: Raymond K. Foster, P.O. Box 1, Madras, Oreg. 97741

[21] Appl. No.: 271,483

[22] Filed: Jul. 7, 1994

Related U.S. Application Data

[63] Continuation-in-part of Ser. No. 153,366, Nov. 16, 1993, Pat. No. 5,355,994.

[51] Int. Cl.⁶ .............................................. B65G 25/04
[52] U.S. Cl. .................................. 198/750.4; 414/525.1
[58] Field of Search ..................... 198/750; 414/525.1

[56] References Cited

U.S. PATENT DOCUMENTS 4,785,929  11/1988  Foster ................................ 198/750
4,821,868   4/1989  Foster ................................ 198/750
5,088,595   2/1992  Hallstrom, Jr. ..................... 198/750
5,125,502   6/1992  Foster ................................ 198/750
5,263,573  11/1993  Hallstrom, Jr. ..................... 198/750
5,267,641  12/1993  Hallstrom, Jr. ..................... 198/750

Primary Examiner—D. Glenn Dayoan
Attorney, Agent, or Firm—David P. Campbell

[57] ABSTRACT

A wear plate (42) for each conveyor slat (12) of a reciprocating floor conveyor (10), each wear plate biased laterally by an O-ring tube (50), so that one side edge (44) of each wear plate (42) is pressed into a slot (54) formed by a side ridge (22) and lip (26) of a conveyor slat (12). O-ring tube (50) biases wear plate (42) laterally so that side edge (44) is secured in slot (54) and wear plate (42) is held on conveyor slat (12).

9 Claims, 3 Drawing Sheets

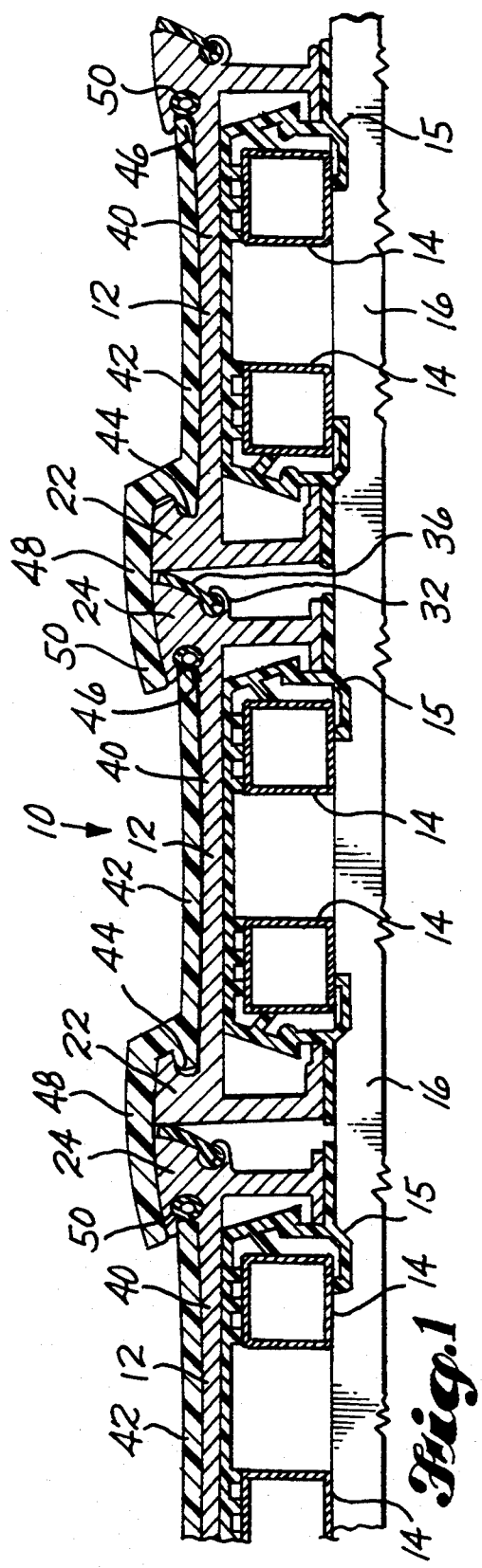
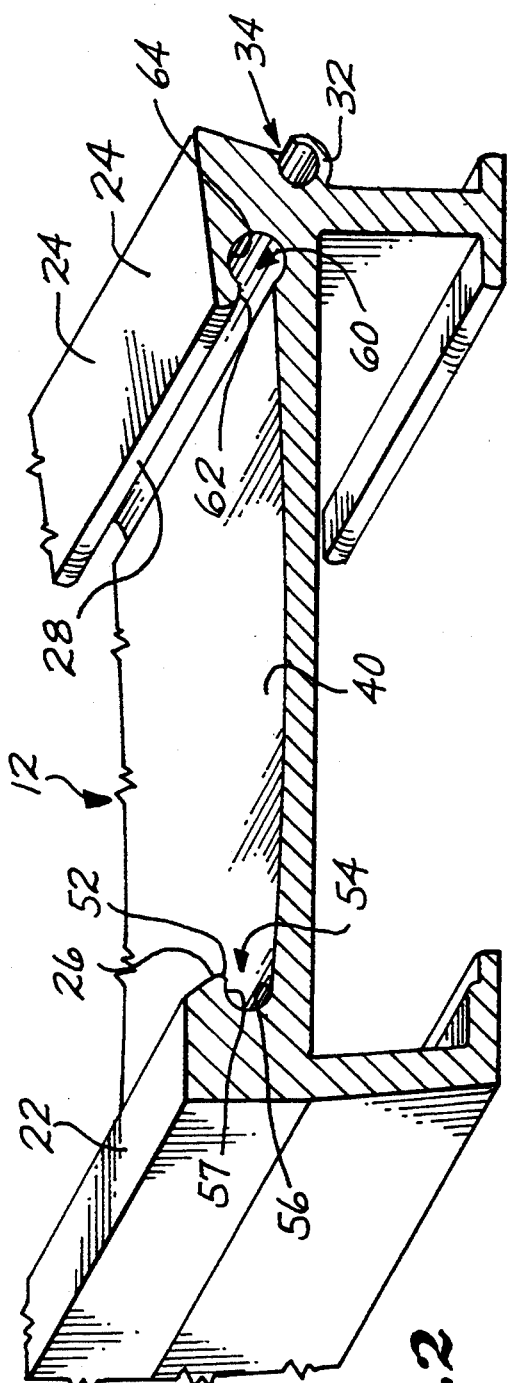

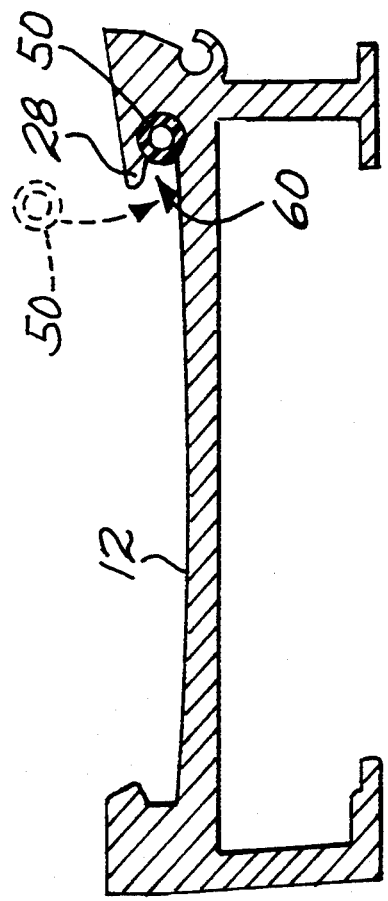
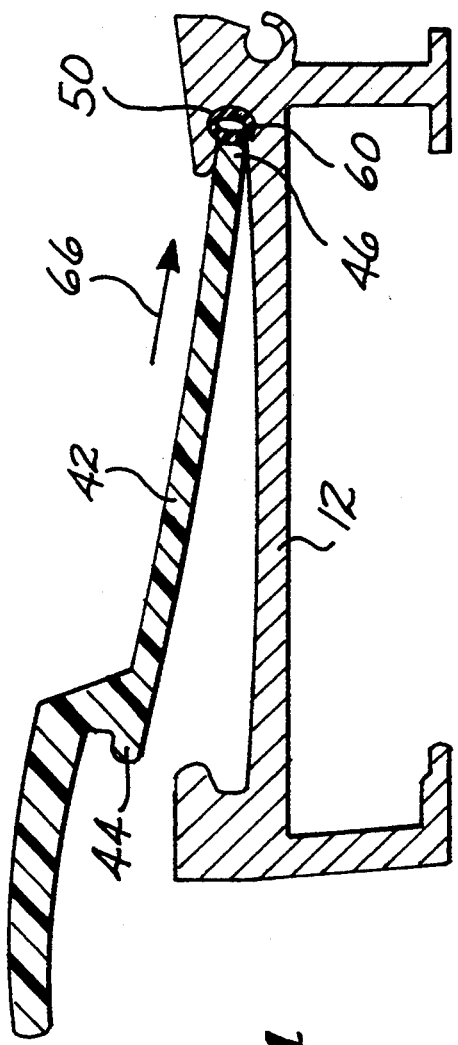
Fig. 3
Fig. 4

SNAP-IN CONVEYOR SLAT WEAR PLATE

RELATED APPLICATIONS

This is a continuation-in-part of my patent application Ser. No. 08/153,366, filed on Nov. 16, 1993, and entitled, "Replaceable Wear Surface for Conveyor Slat" and now U.S. Pat. No. 5,355,994.

TECHNICAL FIELD

This patent pertains to improvements in reciprocating floor conveyors. More particularly, it pertains to an improved design for a wear plate surface that overlies the conveyor slats of the reciprocating floor conveyor to protect the conveyor slats from wear and tear, and to prevent material from getting into gaps between the conveyor slats.

BACKGROUND OF THE INVENTION

My patent application Ser. No. 08/153,366, filed Nov. 16, 1993, and entitled, "Replaceable Wear Surface for Conveyor Slat," and now U.S. Pat. No. 5,355,994 discloses a reciprocating floor conveyor design that includes a wear plate secured to the top of each conveyor slat. The conveyor slats each have raised side edges with longitudinal, inwardly-facing slots formed therein. The side edges of each wear plate are received in these longitudinal slots. A bolt, or other type of mechanical fastener, secures each wear plate to its conveyor slat.

To install the wear plates onto the conveyor slats, it is necessary to slide the wear plates lengthwise of the conveyor slats with the side edges of the wear plates sliding along the longitudinal slots of the conveyor slats. The wear plates are secured to slats with a bolt. It has been discovered that such an installation procedure is sometimes difficult, or at least inconvenient, during assembly of the reciprocating floor conveyors, and in many retrofit applications.

An object of the present invention is to provide for easy assembly, installation and replacement of the wear plates onto the conveyor slats.

SUMMARY OF THE INVENTION

Briefly described, the present invention comprises a reciprocating floor conveyor having a plurality of side-by-side, elongated, longitudinally-movable conveyor slats, and an elongated wear plate for each conveyor slat, which wear plate is adapted to lie on a top portion of the conveyor slat. The top portion of each conveyor slat has a pair of laterally-spaced ridges running the length of the conveyor slat. Each ridge includes an inwardly-projecting lip that defines a slot between the ridge and the top portion of the conveyor slat. The elongated wear plate rests on the top portion of the conveyor slat between the ridges, with the lateral side edges of each wear plate positioned within the slots defined by the ridges. A biasing means is provided within one of the slots of each conveyor slat for biasing each wear plate laterally, so that the side edge of the wear plate opposite the biasing means is pressed into its slot and is secureably held therein.

According to an aspect of the invention, the ridge and its corresponding lip opposite the biasing means of each conveyor slat is specifically designed to allow for easy snap-in installation of the wear plate. The lip itself is curved to minimize resistance of the side edge of the wear plate being pressed downward past the lip and into the adjacent slot.

According to another aspect of the invention, the width of the wear plate is slightly less than the width of the top portion of the conveyor slat defined between the upstanding ridges on the conveyor slat. In this manner, the interference between the side edge of the wear plate and the adjacent lip on the ridge opposite the biasing means is minimized.

According to another aspect of the invention, the biasing means comprises an elongated O-ring tube that is inflated and deflated during the wear plate installation process. The O-ring tube is first deflated so that one edge of the wear plate can be inserted into the slot of the O-ring tube, whereby the side edge of the wear plate compresses the O-ring tube. Passage of the opposite side edge downwardly past the lip of the conveyor slat opposite the O-ring tube is facilitated due to the lateral movement of the wear plate into the O-ring slot, allowed for by the compression of the deflated O-ring tube. Once the side edge of the wear plate opposite the O-ring tube is snapped into its corresponding slot, the wear plate shifts laterally toward that slot. Inflating the O-ring tube further biases the opposite side edge of the wear plate into its corresponding slot.

According to another aspect of the invention, the snap-in slot opposite the O-ring tube tapers inwardly, and the corresponding side edges of the wear plate also taper inwardly, so that the side edge of the wear plate can wedge into the slot, with force applied by the O-ring tube. The tapered design of the snap-in slot, as well as provision of the O-ring tube, securely holds the wear plate on the conveyor slat, and eliminates the need for a mechanical fastener.

With the present design, the wear plates can be mounted onto the conveyor slats from above the conveyor slats, rather than having to be slid lengthwise along the conveyor slats. Installation and replacement of the wear plates is simplified.

These and other advantages and features will become apparent from the following detailed description of the best mode for carrying out the invention and the accompanying drawings, and the claims, which are incorporated herein as part of the disclosure of the invention.

BRIEF DESCRIPTION OF THE DRAWINGS

In the figures, like reference numerals refer to like parts throughout the several views, wherein:

FIG. 1 is sectional view of three side-by-side conveyor slats, each having a wear plate secured thereon, according to the present invention;

FIG. 2 is a sectional, pictorial view of a conveyor slat of FIG. 1;

FIGS. 3–6 are a sequence of sectional views illustrating the snap-in process for mounting a wear plate onto a conveyor slat according to the present invention.

BEST MODE FOR CARRYING OUT THE INVENTION

Figure 5:
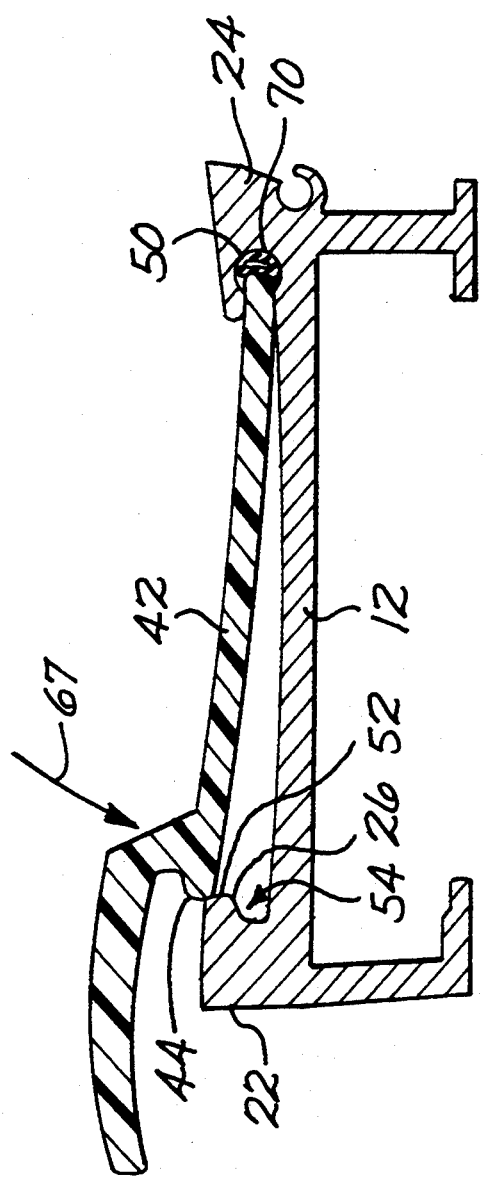

In FIG. 1, a reciprocating floor conveyor 10 constructed in accordance with the present invention is shown in partial section. Conveyor slats are indicated at 12, guide beams are indicated at 14, and bearing brackets are indicated at 15. Guide beams 14 are mounted, as by welding, to cross members 16, which span the lateral width of the reciprocating floor conveyor 10 and form part of the structural framework for the reciprocating floor conveyor. The design of the structural framework for the reciprocating floor conveyor 10, as well as the design of guide beams 14 and bearing brackets 15 do not form a part of the present invention. For further explanation of the design for these components, reference is made to my prior U.S. Pat. No. 4,785,929, titled, "Bearing System for Reciprocating Floor Conveyor," granted Nov. 22, 1988, which along with my patent application Ser. No. 08/153,366, titled, Replaceable Wear Surface for Conveyor Slats," filed Nov. 16, 1993, and now U.S. Pat. No. 5,355,994 are incorporated herein as part of the disclosure of the present invention.

The design of conveyor slats 12 in the present invention is a slightly modified version of the conveyor slats (12) of my aforementioned co-pending patent application. As shown in FIG. 2, conveyor slats 12 each include a first raised side ridge 22 and a second raised side ridge 24. First side ridge 22 includes an inwardly-projecting lip 26. Second side ridge 24 also includes an inwardly-projecting lip 28. Conveyor slats 12 also include a side ledge 32 forming a groove 34. A seal strip 36 (FIG. 1) is carried in groove 34 and is biased against a side ridge 22 of an adjacent conveyor slat 12.

Conveyor slats 12 include a top portion 40. Wear plates 42 rest on top portions 40 of conveyor slats 12. Wear plates 42 include a first side edge 44 and a second side edge 46. Each wear plate 42 also includes an upwardly and outwardly-projecting flange cover 48. Flange cover 48 extends over side ridge 22 of the conveyor slat 12 on which the wear plate 42 is secured, as well as over the adjacent side ridge 24 of an adjacent conveyor slat 12. A biasing mechanism 50 is positioned between second side edge 46 of wear plate 42 and second side ridge 24, Biasing mechanism 50 is discussed later.

In FIG. 2, it can be seen that lip 26 includes a curved face 52. Lip face 52 defines a slot 54 between side ridge 22 and top portion 40 of conveyor slat 12. Slot 54 shall be referred to as the "snap-in" slot. Snap-in slot 54 includes tapered sides 56, 57.

Lip 28 of ridge 24 defines a partially-circular slot 60, in which the biasing mechanism 50 is positioned. Biasing mechanism 50 comprises an elongated, O-ring tube, preferably made of an elastomeric or otherwise flexible and resilient material. Suitable pneumatic connections are provided at the ends of the O-ring tube 50 for inflating and deflating the tube 50.

In FIG. 1, O-ring tube 50 is shown in a compressed position, compressed by side edge 46 of wear plate 42 into slot 54. As shown, O-ring tube 50 biases side edge 44 of wear plate 42 into snap-in slot 54. Lip 28 overhangs slot 60 so that the lower edge 62 of lip 28 is lower than the upper circular surface 64 of slot 60, thereby forming a constriction in front of slot 60. This ensures that biasing mechanism 50 remains in slot 60 once installed therein.

Figure 6:
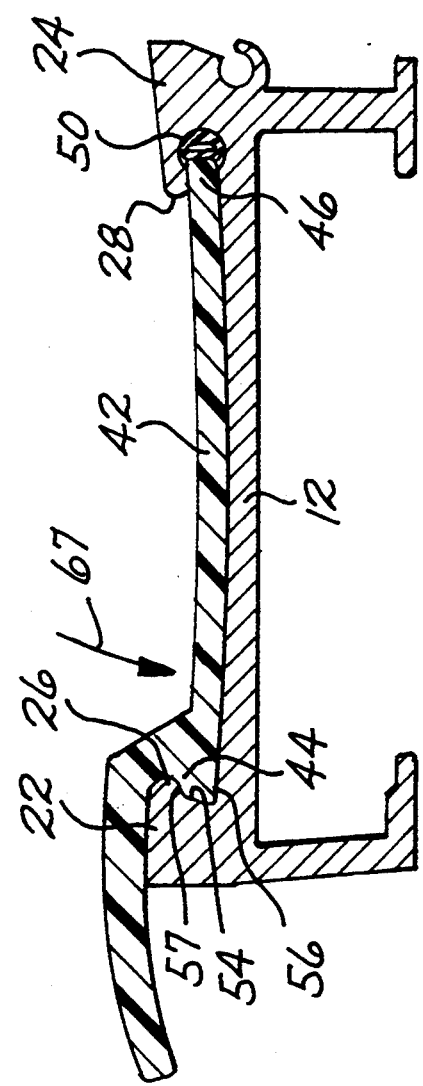

FIGS. 3-6 illustrate steps for installing a wear plate 42 onto a conveyor slat 12. In FIG. 3, the wear plate is not illustrated. However, O-ring tube 50 is illustrated first in phantom lines and second in solid lines shown installed in slot 60. Lip 28 secures O-ring tube 50 in slot 60. In FIG. 4, wear plate 42 is shown being installed onto conveyor slat 12. Second side edge 46 of wear plate 42 is inserted into slot 60 until it compresses O-ring tube 50, as indicated by arrow 66. In FIG. 5, first side edge 44 of wear plate 42 is pressed past lip 26 of ridge 22. Side edge 44 is pressed past surface 52 of lip 26, as indicated by arrow 67, until side edge 44 is snapped into slot 54, as shown in FIG. 6.

As shown in FIG. 6, tapered sidewalls 56, 57 of slot 54 receive side edge 44 of wear plate 42 in a friction fit. O-ring tube 50 is inflated so that wear plate 42 is biased laterally toward side ridge 22 of conveyor slat 12. The tapered sides of side edge 44 fit into slot 54 and engage tapered sidewalls 56, 57. This helps keep each wear plate 42 secured to its conveyor slat 12.

Each wear plate 42 has a lateral dimension or width between its side edges 44, 46 that is greater than the distance between inwardly-projecting lips 26, 28. This keeps wear plates 42 held down on the conveyor slats 12. Also, the width of wear plates 42 is less than the distance between lip 26 and sidewall 70 (FIG. 5) of slot 60. This provides sufficient space for wear plate 42 to be pressed downwardly past lip 26 and into slot 54.

The design of the reciprocating floor conveyor at its outward side edges is not illustrated in the present application. Reference is made to my co-pending patent application Ser. No. 08/153,366, and specifically to FIG. 3 of that patent application, for the design of the outermost conveyor slats and their corresponding wear plates. It should be noted that the wear plate mounted to one of the outermost conveyor slats includes an additional upwardly and outwardly-directed flange cover similar to cover flange 64, shown in FIG. 3 of the aforementioned patent application. It is necessary that this flange cover be spaced inwardly from lip 28 a sufficient distance to allow lateral movement of side edge 46 into slot 60.

The design of the conveyor slats and wear plates of the present invention allows the wear plates to be snap-fitted onto the conveyor slats from above the conveyor slats, rather than having to be inserted into the slots of the conveyor slats from one end thereof. Such a design simplifies installation of the wear plates, both during initial assembly or in a retrofit application.

The tubular design of biasing mechanism 50 replaces mechanical fasteners used in my aforementioned co-pending patent application. However, other designs for biasing mechanism 50 are suitable for biasing wear plates 42, the embodiment. Other equivalent designs for biasing wear plates 42, which designs allow for easy installation of the wear plates, such as, for example, a spring-loaded mechanism, are considered to be within the scope of the present invention.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A reciprocating floor conveyor, comprising:
  a plurality of side-by-side, elongated, longitudinally-movable conveyor slats,
  each conveyor slat having a top portion that has a pair of laterally-spaced ridges,
  each ridge including an inwardly-projecting lip that defines a slot between the ridge and the top portion of the conveyor slat, an elongated wear plate having side edges for each conveyor slat adapted to lie on the top portion of the conveyor slat between the ridges of the lateral side edges of each wear plate, with the wear plate side edges positioned within the slots defined by the ridges of the conveyor slat, and biasing means for biasing each wear plate laterally so that the side edge of the wear plate opposite the biasing means is pressed into its slot and is secureably held therein.

2. The reciprocating floor conveyor of claim 1, wherein the biasing means is positioned within one of the slots of each conveyor slat.

3. The reciprocating floor conveyor of claim 1, wherein the slot opposite the biasing means has tapered side walls, and the corresponding side edge of the wear plate also includes tapered side edges, so that the tapered side walls and side edges of the slot and wear plate engage in a friction fit as the biasing means biases the wear plate laterally.

4. The reciprocating floor conveyor of claim 1, wherein the biasing means includes an O-ring tube that is connected to a pressure fluid source so that it can be inflated and deflated to bias a wear plate laterally.

5. The reciprocating floor conveyor of claim 4, wherein the lip of the ridge that defines a slot for the O-ring tube slightly overhangs downwardly to form a constriction that assists in keeping the O-ring tube within its slot.

6. The reciprocating floor conveyor of claim 5, wherein the slot for the O-ring tube in substantially circular to accommodate the O-ring tube.

7. The reciprocating floor conveyor of claim 1, wherein each wear plate includes an upwardly and outwardly-projecting cover flange that covers one of the ridges of the conveyor slat on which the wear plate is mounted, and also covers one of the ridges of an adjacent conveyor slat.

8. The reciprocating floor conveyor of claim 1, wherein each wear plate has a lateral dimension between its side edges that is greater than the distance between the inwardly-projecting lips of each conveyor slat, and which lateral dimension is less than the distance between the inwardly-projecting lip opposite the biasing means and the ridge adjacent the biasing means.

9. A reciprocating floor conveyor, comprising:
a plurality of side-by-side, elongated longitudinally-movable conveyor slats,
each conveyor slat having opposite upper side portions, each said upper side portion including a slot directed laterally inwardly towards and confronting the slot in the other upper side portion,
an elongated wear plate for each conveyor slat, each wear plate substantially covering its conveyor slat, and each wear plate including opposite side edge portions positioned in said slots, and
an elongated spring in at least one of said slots, adapted to bias the wear plate laterally towards the other slot.

* * * * *